United States Patent [19]
Hatanaka et al.

[11] Patent Number: 5,285,289
[45] Date of Patent: Feb. 8, 1994

[54] RECORDING AND REPRODUCING INFORMATION APPARATUS FOR SELECTIVELY RECORDING A PCM AUDIO SIGNAL OR A DIGITAL SIGNAL IN PLACED THEREOF

[75] Inventors: Yuji Hatanaka, Yokohama; Shinichi Obata, Fujisawa; Toshifumi Takeuchi, Yokohama, all of Japan

[73] Assignee: Hitachi, Ltd., Tokyo, Japan

[21] Appl. No.: 843,191

[22] Filed: Feb. 28, 1992

[30] Foreign Application Priority Data

Apr. 1, 1991 [JP] Japan .................. 3-092633

[51] Int. Cl.$^5$ .............................. H04N 5/76
[52] U.S. Cl. .................. 358/343; 358/341; 360/19.1
[58] Field of Search ............... 358/343, 341, 337, 339, 358/310, 320, 313; 360/19.1, 8, 32, 18, 36.2, 39

[56] References Cited
U.S. PATENT DOCUMENTS
4,617,599 10/1986 Noguchi et al. ............... 360/32
4,937,686 6/1990 Arai et al. .................... 360/32

FOREIGN PATENT DOCUMENTS
62-170078 7/1987 Japan .

Primary Examiner—Tommy P. Chin
Assistant Examiner—Robert Chevalier
Attorney, Agent, or Firm—Antonelli, Terry, Stout & Kraus

[57] ABSTRACT

An apparatus for recording and reproducing a video signal and a PCM audio data sampled by a sampling frequency being asynchronous to a field frequency of a video signal. The apparatus enables to record and reproduce the digital data formatted at each field. The apparatus includes an address control circuit for switching the number of sample values to be recorded per field and a clock generating circuit. The clock generating circuit provides a VCO for forcibly stopping the switching of the number of the sample values, keeping the number of the sample values constant and generating a sampling clock being synchronous to a field frequency, based on a signal sent from an input terminal for a selecting signal. When recording a different digital data from the PCM audio data, the sampling clock sent from the clock generating circuit is used in the address control circuit.

20 Claims, 9 Drawing Sheets

ABSORBING ASYNCHRONISM ( AUDIO DATA )

ANOTHER KIND OF DATA ically to the recording and reproducing information apparatus for a PCM audio signal capable of selecting the audio data signal as desired, such that the PCM audio data or a different kind of digital data can be selectively recorded on a recording part for the PCM audio signal.

RECORDING AND REPRODUCING INFORMATION APPARATUS FOR SELECTIVELY RECORDING A PCM AUDIO SIGNAL OR A DIGITAL SIGNAL IN PLACED THEREOF

BACKGROUND OF THE INVENTION

The present invention relates to a recording and reproducing information apparatus such as a 8-mm VTR which can record and reproduce a video signal and a PCM audio signal at the same time, and more particularly to the recording and reproducing information apparatus for a PCM audio signal capable of selecting the audio data signal as desired, such that the PCM audio data or a different kind of digital data can be selectively recorded on a recording part for the PCM audio signal.

Consider that the PCM audio signal to be recorded concurrently with the video signal is not sampled by a sampling frequency being asynchronous to a field frequency of the video signal. If a constant ratio is not kept between the field frequency and the sampling frequency, in general, there may take place a disadvantage that the PCM audio cannot be recorded exactly.

The prior art described in JP-A-62-170078 is provided for overcoming the disadvantage of the VTR for recording and reproducing the video signal and the PCM audio signal at the same time. In this prior art, the number of samples to be recorded per field may be changed depending on the ratio of the field frequency of a video signal to the sampling frequency of an audio signal, for the purpose of maintaining the asynchronism between both of the frequencies.

This prior art, therefore, makes it possible to record and reproduce the video signal and the PCM audio signal sampled by the sampling frequency being asynchronous to the field frequency of the video signal. For example, it is possible to directly record the PCM audio signal sampled by the sampling frequency of 48 kHz or 32 kHz while recording the video signal sent from a broadcasting satellite.

Basically, the prior art enables to record normal digital data on the recording part in place of the PCM audio signal. For example, a still picture may be recorded and reproduced together with a moving picture. For the purpose, no additional processing circuit is required for the other kind of data only if the signal recorded on the recording medium keeps its format unchanged.

However, the technique for maintaining the asynchronism described in the prior art changes the number of data pieces to be recorded per field and the number of fields at which a predetermined amount of data is recorded and reproduced. Moreover, since the field head data remains undefined, the difficulty takes place in formatting the data at each field. If, on the other hand, the number of data pieces to be recorded per field is defined, the asynchronism disables to exactly record the input digital data.

SUMMARY OF THE INVENTION

It is, therefore, an object of the present invention to provide a function of recording and reproducing digital data formatted at each field concurrently with a video signal to the recording and reproducing information apparatus which can concurrently record and reproduce the video signal and the PCM audio signal sampled by a sampling frequency being asynchronous to a field frequency of the video signal.

In carrying out the object, the recording and reproducing information apparatus capable of making up data frames on a recording medium and recording and reproducing a digital signal on the data frames, includes a digital signal processing circuit having a memory with a predetermined volume, a control circuit for changing the number of digital signals in the data frame depending on the difference between the number of data pieces input to the digital signal processing circuit and the number of data pieces output to be recorded on the recording medium, and a VCO for selecting if the number of digital signals in the data frame is variable or fixed, if the digital data except that the PCM audio data is recorded, forcibly stopping the switching of the number of sample values per field and keeping the number of sample values recorded per field constant, and generating a sampling clock being synchronized with a field frequency. This kind of VTR provides a VCO for generating a sampling clock. Hence, the VTR should be arranged to just widen the variable width of an oscillating frequency of the VCO.

If, unlike the above case, the switching of the number of sampled values to be recorded per field is not stopped, an identification signal should be inserted at each break of the data piece independently of the number of the sampled values to be recorded per field.

If the number of sampled values to be recorded per field becomes fixed when recording the digital data except for the PCM audio signal, the sampling frequency becomes variable. For example, as the number of the sampled values to be recorded becomes maximum, the sampling frequency becomes higher and as the number becomes minimum, the sampling frequency becomes lower. Hence, it is necessary to keep the sampling frequency variable. If, however, the variable sampling frequency is not synchronous to the field frequency, the number of data pieces to be recorded per field becomes larger or fewer. To cope with this shortcoming, it is effective to use the VCO for generating the sampling clock synchronized with the field frequency. The use of the VCO makes it possible to record and reproduce the digital data sampled at the clock synchronized with the field frequency concurrently with the video signal.

DESCRIPTION OF THE PREFERRED EMBODIMENTS

Figure 1:
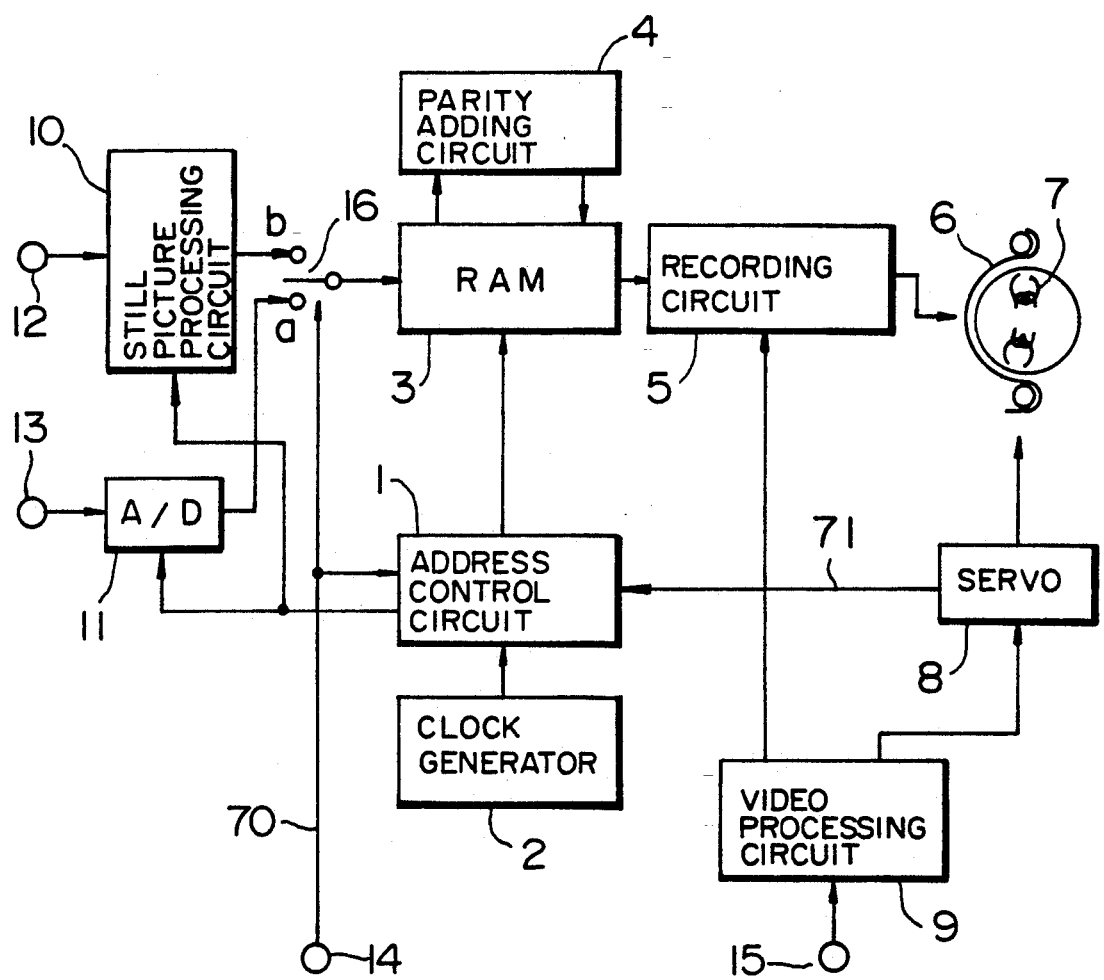
FIG. 1 is a block diagram showing an essential portion of a recording part of a VTR according to an embodiment of the present invention.

Hereafter, the description will be directed to the embodiments of the invention as referring to FIGS. 1 to 12. FIG. 1 is a block diagram showing a recording part of an 8-mm VTR for recording a still picture and a PCM audio signal. As shown, 1 is an address control circuit, 2 is a clock generating circuit, 3 is a RAM, 4 is a parity adding circuit, 5 is a recording circuit, 6 is a magnetic tape, 7 is a rotary head mounted on a rotary drum, 8 is a servo control circuit, 9 is a video processing circuit, 10 is a still picture processor, 11 is an analog-to-digital (A/D) converter, 12 is an input terminal for a still picture data, 13 is an input terminal for an audio signal, 14 is an input terminal for a selecting signal for selecting the audio recording or still picture recording, 15 is an input terminal for a video signal, 16 is a switch for switching a PCM audio signal or a still picture. The magnetic tape 6 is wound around the predetermined range of the rotary drum (corresponding to the range of about 220° in this embodiment) as the run of the tape 6 is being controlled by a tape running system (not shown). The rotary drum (rotary head 7) is controlled by the servo control circuit 8. The recording circuit 5 outputs a signal to the rotary head 7 so that the signal is written on the magnetic tape as the drum is being controlled.

Figure 2:
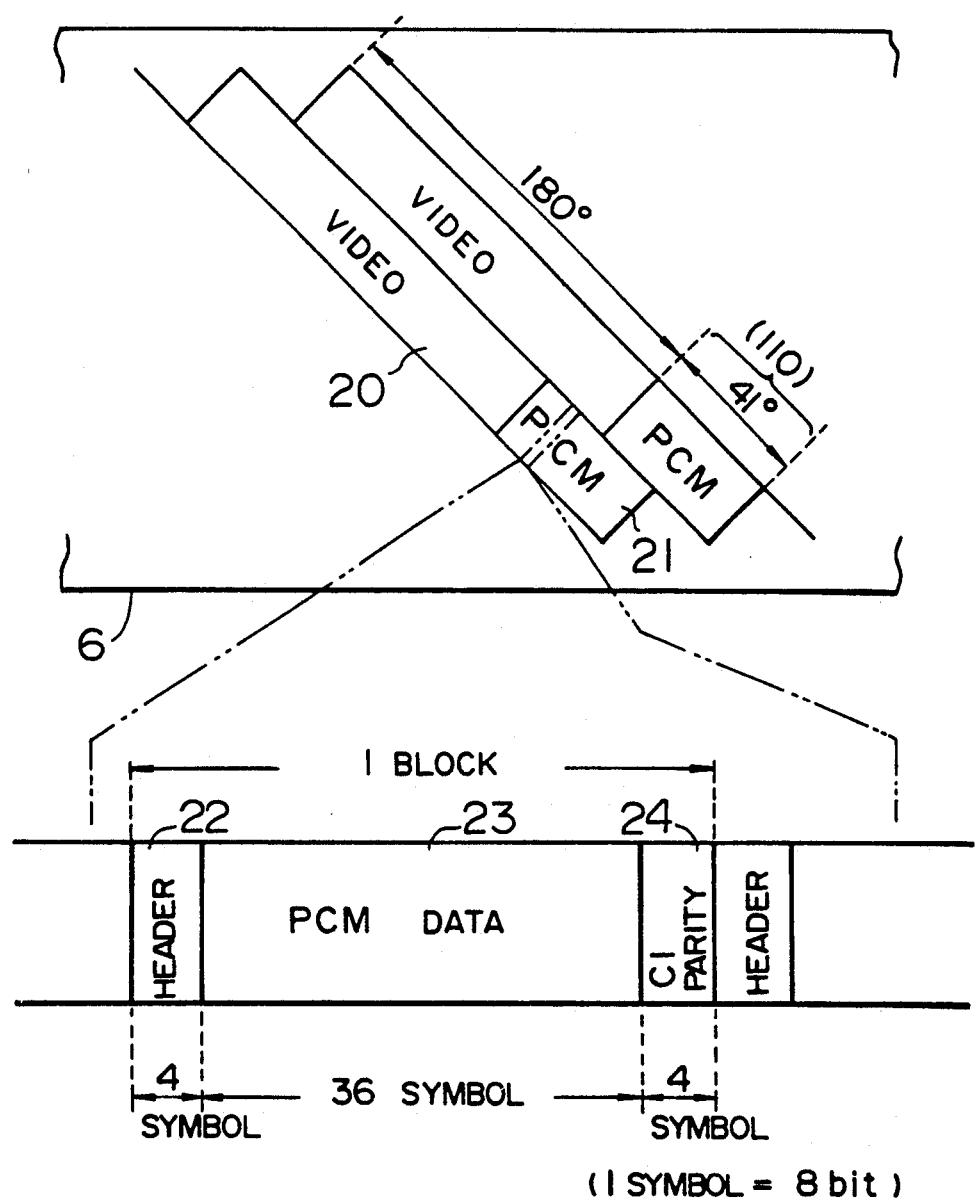
FIG. 2 is an explanatory view showing a recording track format formed on a tape in the embodiment shown in FIG. 1.

FIG. 2 shows a recording track format used in the 8-mm VTR shown in FIG. 1. As shown in FIG. 2, a video signal is recorded on a video area 20 corresponding to the rotation angle of 180° of the rotary head 7 and a PCM audio or a still picture signal is recorded on an overlap area (PCM area) 21 corresponding to the rotation angle of 41° of the rotary head 7. The PCM area 21 contains the PCM signal consisting of 110 blocks, one block being configured to have a 4-symbol (one symbol=8 bits) header 22, a 36-symbol PCM data 23, and a 4-symbol error correcting C1 parity 24. The PCM data 23 has an additional error correcting C1 parity 33, which forms a different code from the C1 parity 24 (see FIG. 3).

In turn, the description will be directed to the operation of recording the PCM audio signal. An analog audio signal is input to the A/D converter 11 through the input terminal 13. In the A/D converter 11, the analog audio signal is converted into a digital signal. If the switch 16 is selected toward the contact a shown in FIG. 1, the digital signal is temporarily stored in the RAM 3. The parity adding circuit 4 serves to add the C1 parity 24 and the C2 parity 33 to the digital signal held in the RAM 3. Then, the resulting signal is sent to the recording circuit 5. The recording circuit 5 serves to process the PCM audio data signal sent from the RAM 3 and a video signal sent from the video processing circuit 9 and record these signals on the magnetic tape 6 in accordance with the format shown in FIG. 2.

Figure 3:
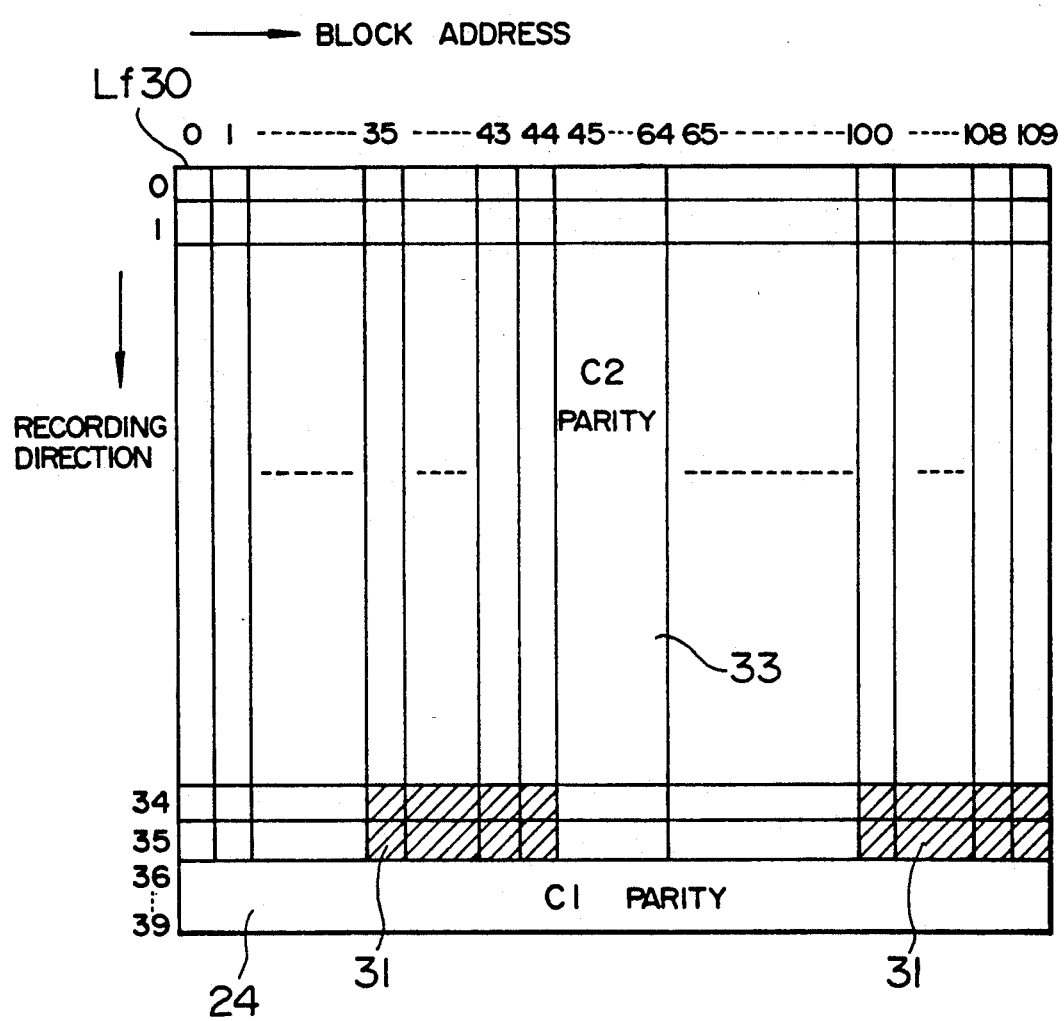
FIG. 3 is an explanatory view showing a memory map on a RAM in embodiment shown in FIG. 1.
Figure 4:
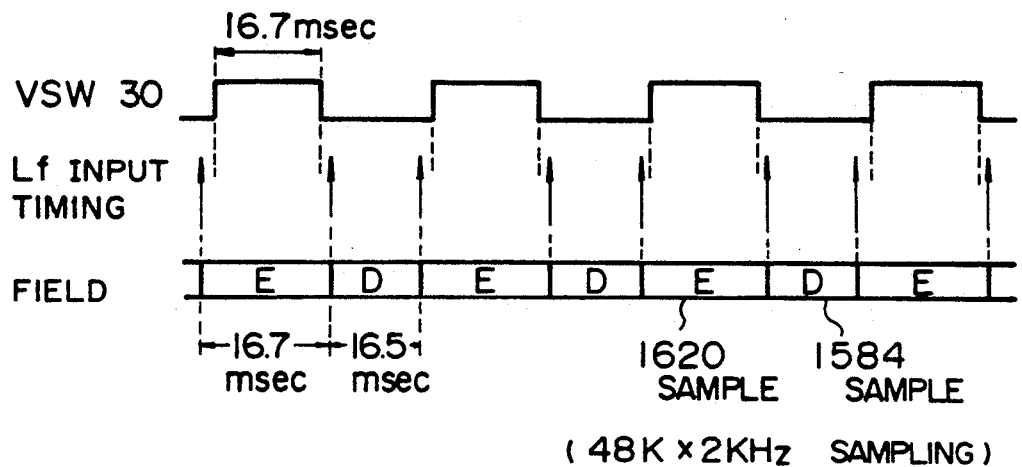
FIG. 4 is an explanatory view showing a timing on which a track head data piece is input when absorbing asynchronism in the embodiment shown in FIG. 1.
Figure 5:
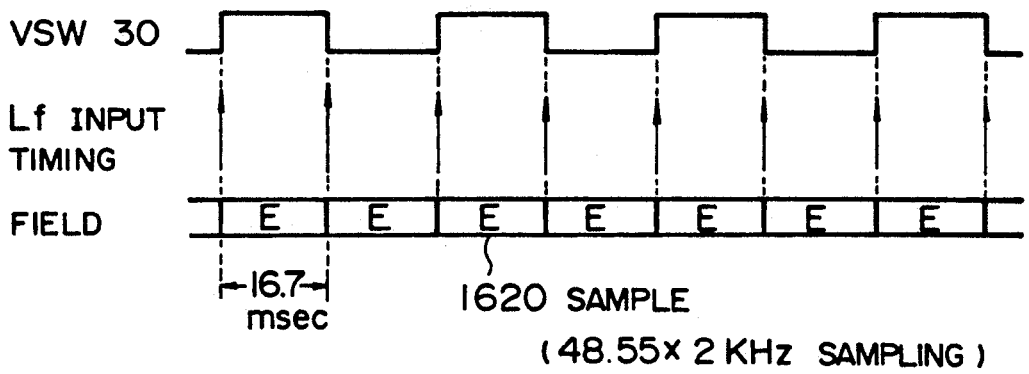
FIG. 5 is an explanatory view showing a timing on which a track head data piece is input when using another kind of digital data in the embodiment shown in FIG. 1.

FIG. 3 shows a data array per field stored in the RAM 3. The signal sent from the A/D converter 11 is input in the horizontal direction and the signal sent to the recording circuit 5 is output in the vertical direction. Herein, 33 denotes the error correcting C2 parity which forms a different code from the C1 parity.

Next, the direction will be directed to the number of the PCM audio sampled values to be recorded by taking an example of an NTSC system. In the NTSC system, the field frequency is 60/1.001 Hz. Hence, the number of the PCM audio sampled values to be recorded per field is:

Number of Sampled Values = Sampling Frequency/Field Frequency (for one channel)

Assuming that the sampling frequency is 48 kHz (for one channel), the number of sampled values is:

800.8×2 (for two channels)

To maintain the asynchronism between the field frequency and the sampling frequency, therefore, the present embodiment prepares a field for recording 810×2 samples (referred to as an E field) and a field for recording 792×2 samples+18×2 dummy data (referred to as a D field) so that the number of the sampled values to be recorded per field becomes 800.8×2 as a result of averaging the sampled values in light of a long time. With this method, if the ratio of the field frequency to the sampling frequency is undefined and is shifted to either of the frequencies, by arranging the frequencies of the E field and the D field, it is possible to exactly record the input PCM audio data and keeping the overall amount of the data recorded on the magnetic tape 6 constant. In FIG. 3, a portion 31 indicated by oblique lines stands for the dummy-data area. For the E field, the PCM audio data is recorded and for the D field, the dummy data is recorded.

In the data input by the A/D converter 11, as shown in FIG. 3, the first data on the RAM map is Lf 30. The input timing of the data Lf 30 is not equally spaced but has a longer interval for the E field and a shorter interval for the D field. When recording normal digital data like still picture data in place of the PCM audio data, therefore, it is difficult to format the data at each field.

To overcome the difficulty, when recording the still picture data, for example, all the fields are made to be the E fields so that the input timing of the Lf data 30 is equally spaced. It is thus possible to keep the number of the sampled values to be recorded per field constant for making it easy to format the data at each field. In this method, however, since the average number of the sampled values to be recorded per field is increased, it is necessary to raise the sampling frequency. Further, if the sampling frequency is not synchronized with the field frequency, the sampled values to be recorded on the magnetic tape 6 is too much or less. To overcome this shortcoming, a PLL (pulse locked loop) is arranged to refer to the field frequency as a master clock for generating the sampling clock and the VCO is arranged to supply an output signal synchronized with the field frequency.

Figure 6:
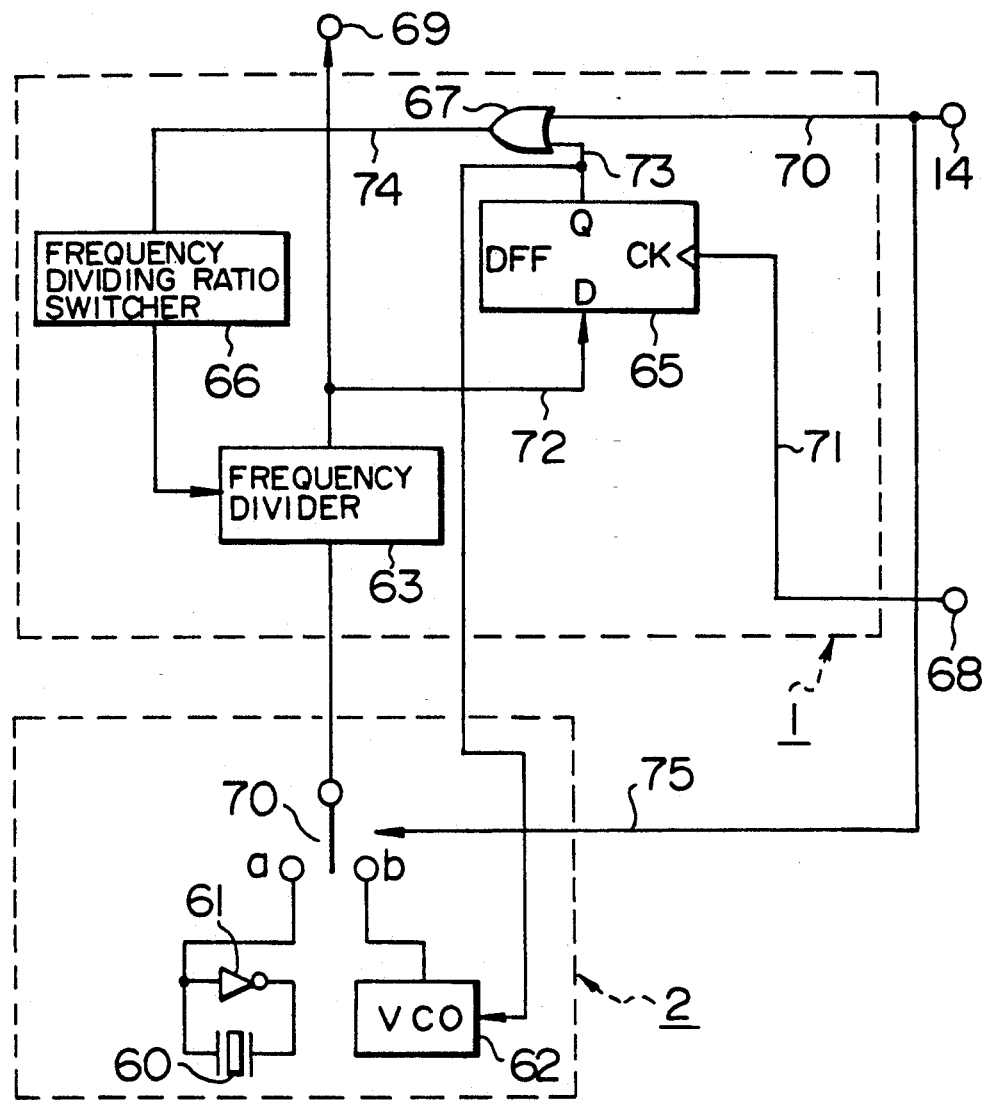
FIG. 6 is a circuit diagram showing a circuit for maintaining asynchronism employed in the embodiment shown in FIG. 1.

FIG. 6 shows a circuit example of the address control circuit 1 and the clock generator 2. As shown, 60 is an oscillator for generating a clock of 48 kHz for sampling the data, 61 is an inverter for oscillating the oscillator 60, 62 is a VCO for varying an oscillating frequency, 63 is a frequency divider, 65 is a latch circuit to be operated on the leading edge of the signal, 66 is a switcher for a frequency-dividing ratio, 67 is an OR circuit, 68 is an input terminal for a signal synchronized with the field frequency, 69 is an output terminal for a RAM address, and 70 is a switch. When recording the PCM audio data, the switch 70 is turned to the a side and the clock for the sampling frequency of 48 kHz, for example, is generated in a fixed manner. When recording another kind of data (still picture), the switch 70 is turned to the b side so that the output of the VCO 62 is made to be a master clock.

Figure 7:
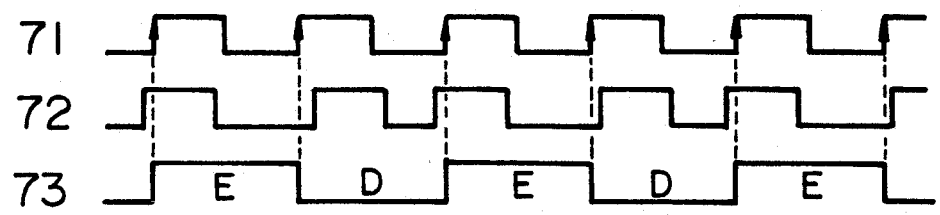
FIG. 7 is an explanatory view showing a timing on which the asynchronism is maintained in the embodiment shown in FIG. 1.

The operation of the latch circuit 65 will be described briefly. In FIG. 6, the signal 71 synchronized with the field frequency (that is, the signal synchronized with the rotation of the rotary head 7) is input at the input terminal 68. The frequency divider 63 serves to divide the clock input from the clock generator 2 and supply a frequency-divided signal 72. As a result, the latch circuit 65 serves to output a phase signal 73. The phase signal 73 rises to a high level when the phase of the frequency-divided signal 72 is earlier than the leading edge of the synchronized signal 71 and drops to a low level when the former is later than the latter as shown in FIG. 7. When recording the PCM audio data, by switching to a low level a selecting signal 75 input to the switch 70, the phase signal 73 is input to the frequency-dividing ratio switcher 66 through the OR circuit 67. Then, by switching the frequency-dividing ratio of the frequency divider 63, the E or D field is selected. That is to say, to maintain the asynchronism, the frequency-dividing ratio is arranged to be larger (corresponding to the E field) when the phase signal 73 is at the high level and the frequency-dividing ratio is arranged to be smaller (corresponding to the D field) when the signal 73 is at the low level. On the other hand, when recording another kind of data, by switching the selecting signal 75 input to the switch 70 to the high level, the output 74 of the OR circuit 67 constantly keeps a high level, thereby leading to selecting the E field.

The aforementioned description has stated that a new VCO is required for recording a different digital data signal from the PCM audio signal such as a still picture data. In the actual VTR, however, the VCO has been originally installed. Hence, without using an additional VCO, only the originally-installed VCO is required for implementing the present embodiment. To clarify this, the reproducing operation of the VTR will be described below.

Figure 8:
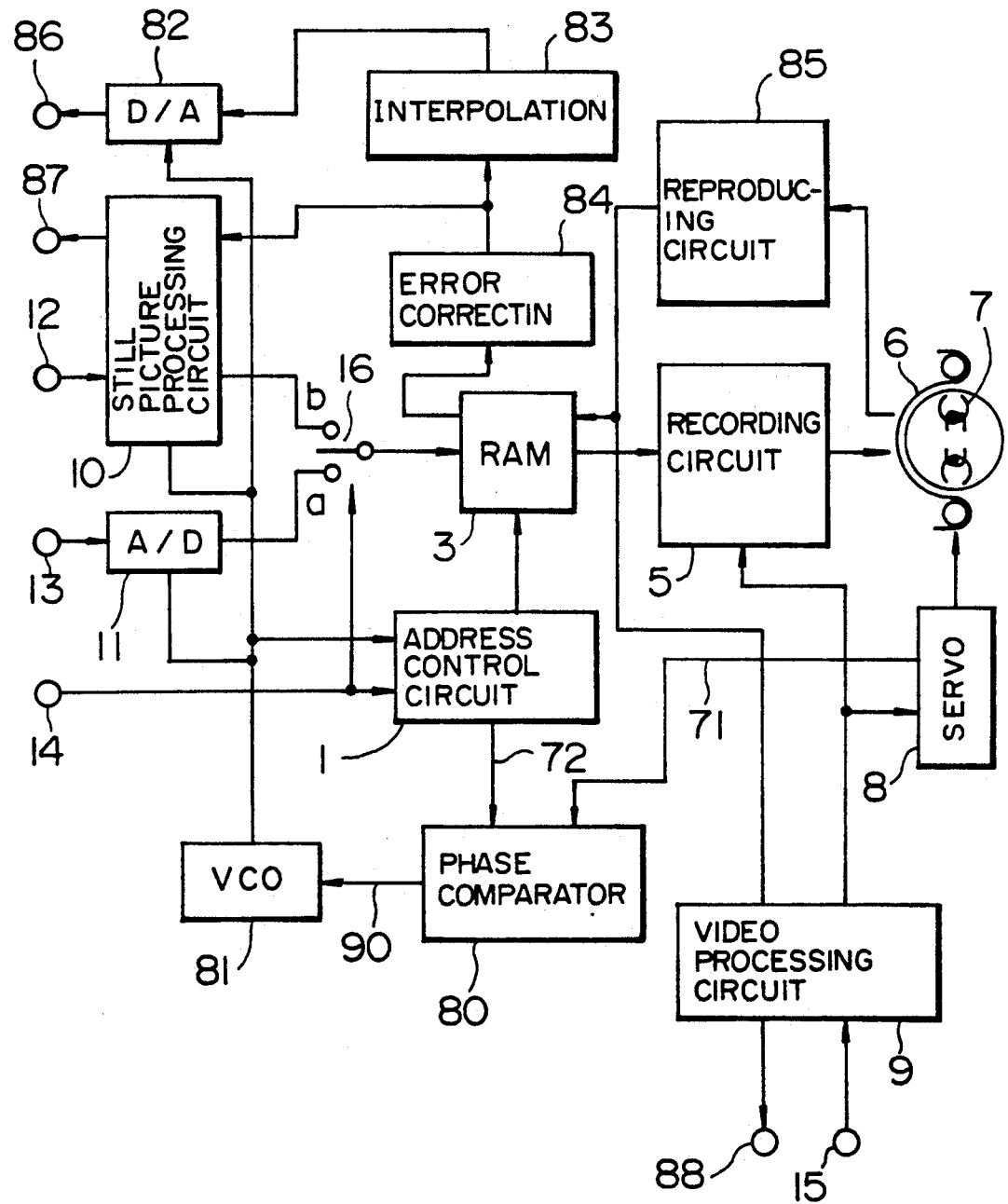
FIG. 8 is a block diagram showing an essential portion of a reproducing part of the VTR in the embodiment shown in FIG. 1.

FIG. 8 shows the VTR containing a reproducing system. As shown, 80 is a phase comparator, 81 is a VCO, 82 is a digital-to-analog (D/A) converter, 83 is an interpolating circuit, 84 is an error correcting circuit, 85 is a reproducing circuit, 86 is an output terminal for an audio signal, 87 is an output terminal for a still picture signal, and 88 is an output terminal for a video signal. The recording operation of the VTR is likewise to that shown in FIG. 1. Hence, the description about the VTR is limited to the reproducing operation.

A signal reproduced from the magnetic tape 6 through the effect of the rotary head 7 is sent to the reproducing circuit 86 in which the signal is processed. Of the signal, the video signal is processed in the video processing circuit and is output at the output terminal 88. The PCM audio data contained in the reproduced signal is sent to the RAM 3 through the reproducing circuit 85. The RAM 3 temporarily stores the PCM audio data. Then, the PCM audio data signal is sent to the error correcting circuit 84 in which the signal is corrected by using the C1 parity 24 and the C2 parity 33. If the error correcting circuit 84 disables to correct the data, the data is sent to the interpolating circuit in which the mean value interpolation is performed with respect to the data. Then, the data is sent to the D/A converter 82 in which the data signal is converted into an analog audio signal. The resulting analog signal is output at the output terminal 86. On the other hand, when reproducing the digital data about a still picture, for example, in place of the PCM audio data, the means value interpolation is meaningless. The reproduced data is sent from the error correcting circuit 84 to the still picture processing circuit 10 without through the interpolating circuit 83. After the data is processed in the circuit 10, the resulting data is output as the data about the still picture at the output terminal 87.

If the reproduced field is the D field, it is natural that the output of the dummy data 32 (see FIG. 3) is inhibited to output under the control of the address control 1. To identify the E field from the D field, it is possible to use the identification code recorded on the part of the header 22 as shown in FIG. 2.

Figure 9A:
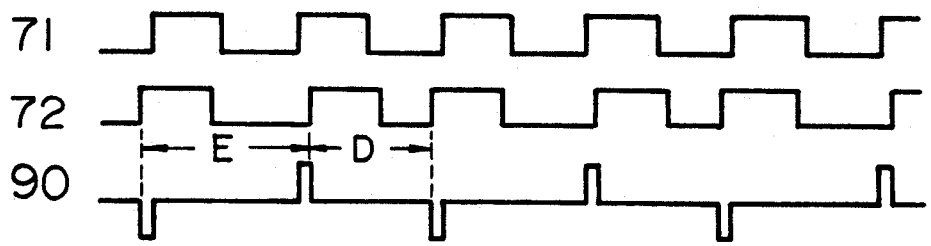
FIGS. 9A and 9B are timing charts showing phase comparison in maintaining the asynchronism in the embodiment shown in FIG. 8.
Figure 9B:
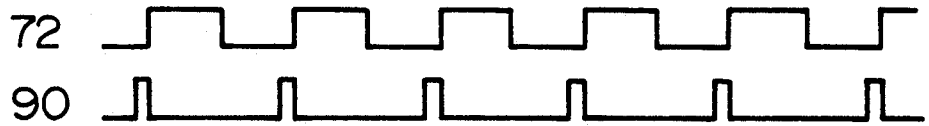
Figure 10:
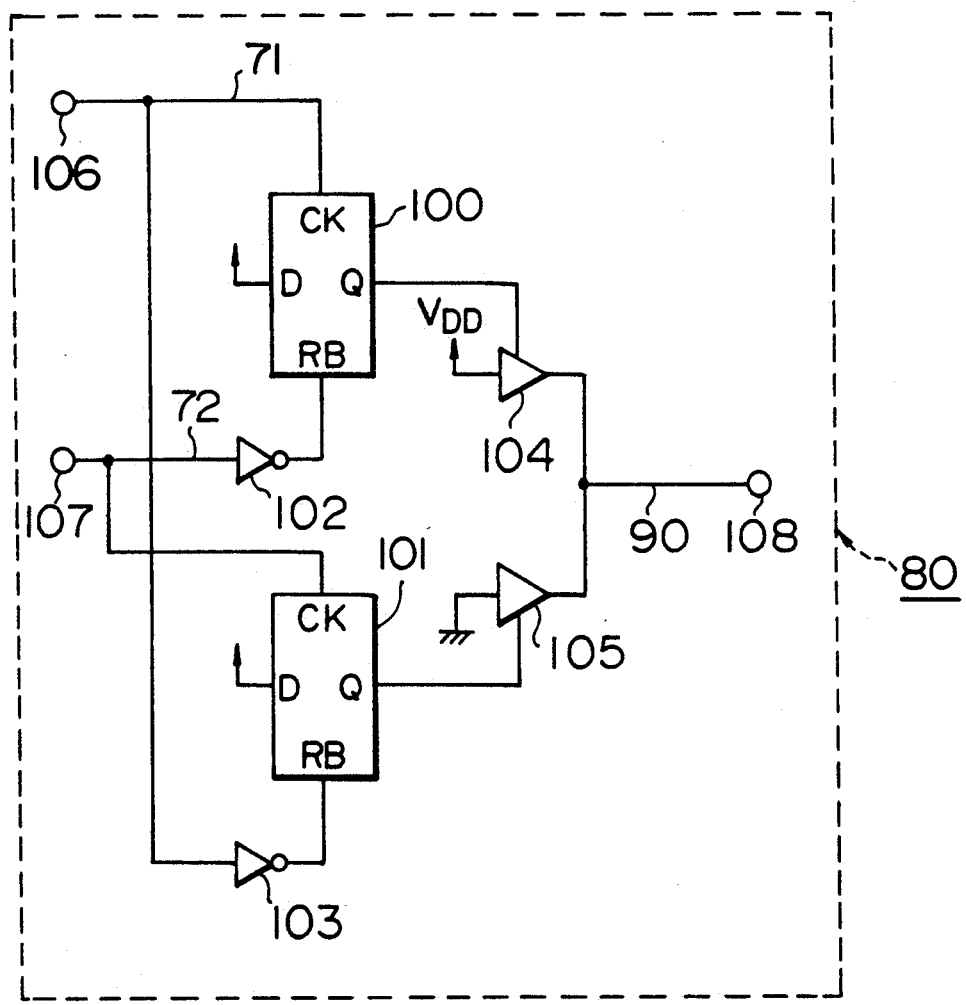
FIG. 10 is a circuit diagram showing a phase comparing circuit used in the embodiment shown in FIG. 8.

Contrary to the recording, the reproducing operation needs to output the data stored in the RAM 3 to the D/A converter 82 through the error correcting circuit 84 without deficiency or excess. For that purpose, the reproducing operation has to use the sampling frequency used in recording. If the field frequency used in recording is identical to that used in reproducing, the field frequency used in recording is allowed to be used. In general, however, the field frequency is not always identical in recording and reproducing. For example, the field frequency used when recording an ordinary TV program is defined by the camera provided in the broadcasting station, while the field frequency used when reproducing the recorded program is defined by the crystal provided in the video processing circuit of the reproducing apparatus. In actual, it is quite difficult to make both of the field frequencies identical to each other. Hence, to output the data from the RAM 3 without deficiency or excess, it is necessary to synchronize the clock for generating the sampling frequency for reproducing with the field frequency for reproducing. That is to say, as shown in FIG. 9A, the oscillating frequency of the VCO is required to be adjusted so that the means period of the frequency-dividing signal 72 is made identical to that of the field frequency (rotating period of the rotary head 7). The means period is derived in light of a long interval and the frequency-divided signal 72 includes 810×2 samples in the E field and 792×2 samples in the D field. This adjustment makes it possible to exactly output the data reproduced from the magnetic tape 6 independently of any deviation of the field frequency used in recording to that used in reproducing. In FIGS. 9A and 9B, 9B is an error voltage, which is generated in the circuit shown in FIG. 10, for example. This signal may be used as a control voltage for the VCO. In FIG. 10, 100 and 101 are latch circuits which are made active at the leading edge of the signal, 102 and 103 are inverters, 104 and 105 are three-state buffers, 106 is an input terminal for a reference signal, 107 is an input terminal for a frequency-dividing signal, and 108 is an output terminal for an error voltage. Each terminal RB of the latch circuits 100 and 101 is a reset terminal, in which it is reset at the low level of the control signal. The three-state buffers 104 and 105 are made highly active. They are turned on when the control signal is at the high level and enter into a high-impedance state when it is at the low level.

In the conventional apparatus, the VCO has been required to have a variable width ranging from the case where all the fields are the D fields (the lowest frequency) to the case where all the fields are the E fields (the highest frequency). That is, the variable width may correspond to the range from the sampling frequency of 47.35 kHz to 48.55 kHz, for example. In this embodiment, however, even if the VCO has a central frequency corresponding to 48.55 kHz, it is possible to generate the sampling frequency given when all the fields are the E fields in synchronous to the field frequency. Hence, the VCO may have a higher variable width than that of the conventional apparatus. For example, the VCO may have the range from 47.35 kHz to 49.00 kHz for implementing this embodiment. FIG. 9B shows how the phase comparator 80 operates in the variable range. The high-level intervals of the error voltage 90 are made larger than those appearing when maintaining the asynchronism so that the oscillating frequency of the VCO 81 is made higher.

As set forth above, this embodiment makes it possible to keep the number of recording data per field constant and easy to format the data per field by using the sampling frequency synchronized with the field frequency if the variable width of the oscillating frequency generated in the VCO is made wider on the higher side from the center of 48 kHz and the fields are selected as the E fields when recording the data.

In the foregoing description, the E fields have been selected when recording a different kind of data from the PCM audio data. In actual, the D fields may be selected if a lower recording rate is not a serious factor. The selection of the D fields results in keeping the recording rate lower, thereby making the time consumed in recording and reproducing the same amount of data longer. Unless it is necessary to consider some factors such as a critical path on the operating speed, the E fields should be selected.

Figure 11:
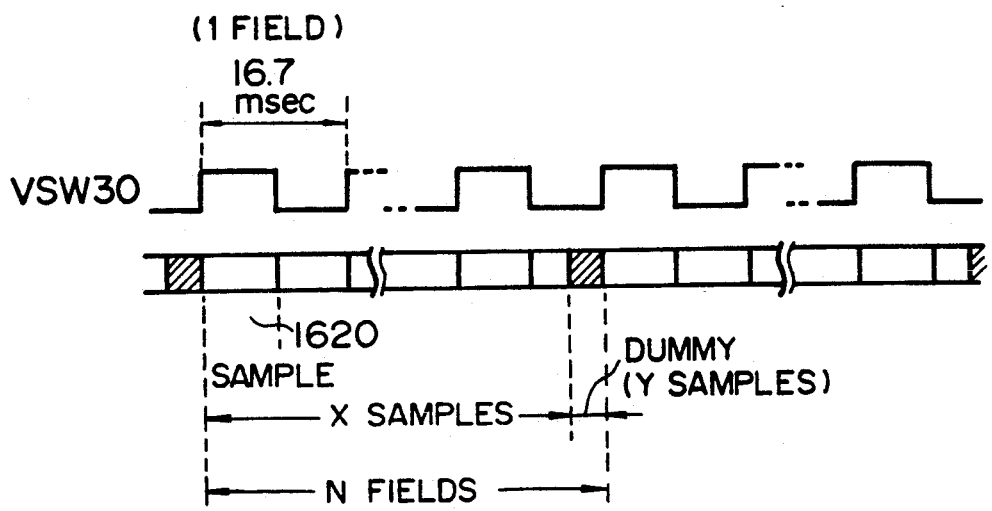
FIG. 11 is a timing chart showing the I/O operation of X sampled data in another embodiment of the invention.
Figure 12:
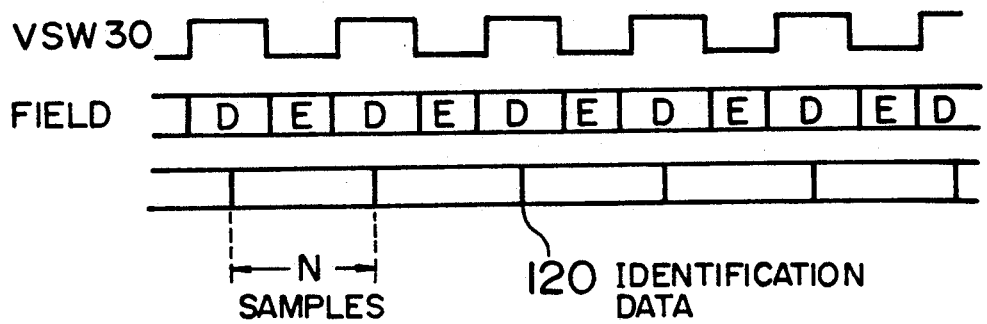
FIG. 12 is a timing chart showing the I/O operation when inserting an identification data.

In case that the unit of the data to be recorded (data of one frame for the still picture, for example) cannot be divided out by the number of data pieces per field, the present invention is capable of packing the data to the previous data frames and adding the dummy data (zero data, for example) to the remaining space of the data frame when formatting the data. As shown in FIG. 11, when recording the data of X samples (which cannot be divided out by 1620), it is possible to add the dummy data of Y samples (X+Y=1620×N fields). Without using the invention, this type of formatting is impossible, because the number of the data pieces contained in the N fields is undefined.

If not using the foregoing embodiment, it may be possible to consider the method of adding the identification data 120 for each of N samples independently of the number of data pieces per field. However, this method disadvantageously increases the data quantity because of using the identification data and the processing steps such as detecting the identification data in reproducing the data. Hence, the foregoing embodiment may offer a more advantage than this method.

The aforementioned description has stated that a video signal is recorded on the video area 20 of the magnetic tape 6 shown in FIG. 2. However, the present invention may apply to a multi-track system where the PCM audio data or the different digital data from the PCM audio data may be recorded on or reproduced from the video area 20.

It will be understood from the above description that the present invention is capable of keeping the number of samples to be recorded per field constant in the apparatus for recording and reproducing the video signal and the PCM audio data formed by the sampling frequency being asynchronous to the field frequency. Hence, the invention makes it possible to easily record and reproduce the digital data formatted at each field in place of the PCM audio data.

We claim:

1. A recording and reproducing information apparatus capable of making up a data frame on a recording medium and recording and reproducing a digital signal on and from said data frame, comprising:
    a digital signal processing circuit having a memory with a predetermined volume;
    a control circuit for changing a number of digital signals in said data frame depending on a difference between a number of data pieces of said digital signal input to said digital signal processing circuit and a number of data pieces output to said recording medium;
    wherein the number of said digital signals in said data frame is selected as a variable or a fixed value;
    means for, when recording a PCM audio signal as said digital signal, making variable the number of said digital signals in said data frame and means for, when recording the digital signal except for said PCM audio signal, making fixed the number of said digital signals in said data frame.

2. A recording and reproducing information apparatus according to claim 1, wherein a pixel data of a still picture to be recorded and reproduced is selected as the digital signal except for said PCM audio signal.

3. A recording and reproducing information apparatus according to claim 1, wherein the fixed number of the digital signals in said data frame is set as a maximum number of signals.

4. A recording and reproducing information apparatus according to claim 1, wherein the fixed number of the digital signals in said data frame is set as a minimum number of signals.

5. A recording and reproducing information apparatus according to claim 1 further comprising:
    a frequency-variable oscillating circuit for generating a clock of a frequency input to said memory in response to said means for making fixed the number of the digital signals in said data frame.

6. A recording and reproducing information apparatus according to claim 1 further comprising:
    a first oscillating circuit for generating a clock of a first frequency input to said memory in response to said means for making variable the number of the digital signals in said data frame;
    a second oscillating circuit of a variable frequency type for generating a clock of a second frequency input to said memory in response to said means for making fixed the number of the digital signals in said data frame;
    a selecting circuit for selecting said first oscillating circuit or said second oscillating circuit;

wherein depending on the means for making fixed the number of digital signals in said data frame or the means for making variable the number of the digital signals in the data frame, the data is input to said memory contained in said digital signal processing circuit on the basis of the clock output from said selecting circuit.

7. A recording and reproducing information apparatus according to claim 1 further comprising:
an oscillating circuit of a frequency variable type for generating a clock of a first frequency input to said memory in response to the means for making variable the number of the digital signals in said data frame and a clock of a second frequency input to said memory in response to the means for making fixed the number of the digital signals in said data frame;
wherein the data input to said memory of said digital signal processing circuit is carried out on the basis of the clock generated by said oscillating circuit.

8. A recording and reproducing information apparatus according to claim 2, wherein when recording a digital signal of Z (Z is a natural number, Z>X) not divided out by a fixed value X (X is a natural number) of the digital signal number in said data frame, said digital signals are packed to the previous N-1 data frames (N is the maximum natural number meeting Z/X) for being recorded on said data frames, a dummy data of Y natural numbers meeting X×N−Z=Y is added to said digital signals of Z−X×(N−1) for recording the added result on the N-th data frame.

9. A recording and reproducing information apparatus according to claim 2, wherein said digital signal is called to be recorded and reproduced concurrently with a video signal.

10. A recording and reproducing information apparatus according to claim 1, further comprising:
means for inserting data for identification to each break of said digital signal when recording said digital signal.

11. A recording and reproducing information apparatus capable of making up a data frame on a recording medium and recording and reproducing a digital signal on and from said data frame, comprising:
a digital signal processing circuit having a memory with a predetermined volume; and
a control circuit for changing a number of said digital signal in said data frame depending on a difference between a number o data pieces of said digital signal input to said digital signal processing circuit in a unit of time and a number of data pieces of said digital signal output to said recording medium from said digital signal processing circuit for recording in the unit of time;
said control circuit includes means settable to a first mode for changing the number of data pieces of said digital signal in said data frame and a second mode for setting the number of data pieces of said digital signal in said data frame to a fixed value, and means for selecting one of said first mode and said second mode.

12. A recording and reproducing information apparatus according to claim 11, wherein when said digital signal is recorded as a PCM audio signal, said second mode is selected, and when said digital signal is recorded as a digital signal except for the PCM audio signal, said first mode is selected.

13. A recording and reproducing information apparatus according to claim 12, wherein pixel data of a still picture is recorded and reproduced as a digital signal except for the PCM audio signal.

14. sA recording and reproducing information apparatus according to claim 11, wherein a maximum number of data pieces of said digital signal in said data frame is set to the fixed value in said second mode.

15. A recording and reproducing information apparatus according to claim 11, wherein a minimum number of data pieces of said digital signal in said data frame is set to the fixed value in said second mode.

16. A recording and reproducing information apparatus according to claim 11, wherein said apparatus further comprises:
a frequency-variable oscillating circuit for generating a clock of a frequency for said digital signal input to said memory in response to said second mode when selected; and
a phase comparator for synchronizing a frame frequency of said data frame with the frequency of the clock supplied from said frequency-variable oscillating circuit by controlling the frequency of said frequency-variable oscillating circuit;
wherein when said second mode is selected, an input operation to said memory in said digital signal processing circuit is carried out in accordance with said clock output from said frequency-variable oscillating circuit.

17. A recording and reproducing information apparatus according to claim 11, wherein said apparatus further comprises:
a first oscillating circuit for generating a first clock of a first frequency for said digital signal input to said memory in response to said first mode when selected;
a second frequency-variable oscillating circuit for generating a second clock of a second frequency for said digital signal input to said memory in response to said second mode when selected;
a phase comparator for synchronizing a frame frequency of said data frame with the frequency of the second clock output from said second frequency-variable oscillating circuit; and
a selection circuit for selecting said first clock in said first mode and said second clock in said second mode;
wherein an input operation to said memory in said digital signal processing circuit is carried out in accordance with said clock output from said selection circuit.

18. A recording and reproducing information apparatus according to claim 11, wherein said apparatus further comprises:
a frequency-variable oscillating circuit for generating a first clock of a first frequency for said digital signal input to said memory in response to said first mode when selected and a second clock of a second frequency for said digital signal input to said memory in response to said second mode when selected; and
a phase comparator for synchronizing a frame frequency of said data frame with the frequency selected from the second clock and first clock output from said frequency-variable oscillating circuit by controlling the frequency of said frequency-variable oscillating circuit;

wherein an input operation to said memory in said digital signal processing circuit is carried out in accordance with the clock output from said frequency-variable oscillating circuit.

19. A recording and reproducing information apparatus according to claim 11, wherein when recording digital signals of Z (Z is a natural number, $Z>Z$) pieces not divided out by a fixed value X (X is a natural number) of data pieced in said data frame in said second mode, said digital signals are packed from a front of said data frames of N-1 (N is the maximum natural number meeting Z/X) pieces, and fixed data of Y (Y is a natural number) pieces meeting $X \times N - Z = Y$ in addition to of said digital signals of $Z - X \times (N-1)$ pieces are packed into an N-th data frame.

20. A recording and reproducing information apparatus according to claim 11, wherein said digital signal is recorded on said recording medium with a video signal concurrently.

* * * * *